Nov. 8, 1960   S. C. HETH   2,958,991
CAM TYPE OPERATING DEVICE FOR CRUSHING ROLLS
Filed Jan. 17, 1958
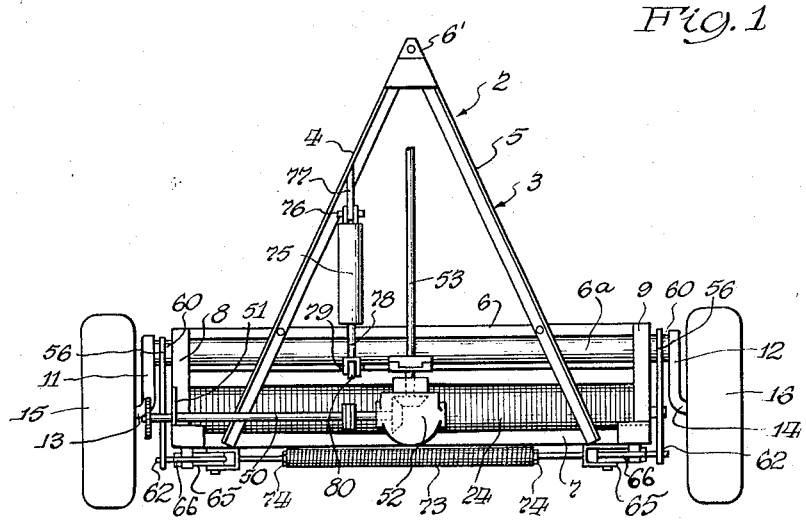
Inventor
Sherman C. Heth
Paul O. Pippel
Attorney

United States Patent Office 2,958,991
Patented Nov. 8, 1960

2,958,991

CAM TYPE OPERATING DEVICE FOR CRUSHING ROLLS

Sherman C. Heth, Chicago, Ill., assignor to International Harvester Company, Chicago, Ill., a corporation of New Jersey Filed Jan. 17, 1958, Ser. No. 709,693

6 Claims. (Cl. 56—1)

This invention relates to machines for processing hay and the like in the field to accelerate curing thereof and more particularly the invention pertains to hay crushers.

Currently there are on the market various types of hay crushers and crimpers. The hay crushers distinguish from the crimpers in that the former attempt to actually physically crush the stems whereas the crimpers are usually intermeshing gear type roll devices which comprise meshing teeth between which the hay is adapted to be moved so that it is bruised along the contact points between the teeth.

In all of these machines the principal problem which has seriously limited the operation of the machine has been the inability of the crushing rolls to act uniformly or substantially so upon all of the material passing between the rolls and particularly when the material would bunch. This would cause the rolls to gap at opposite sides of the bunch or thick wad so that there was very little pressure exerted by the rolls against the material passing through the gaps.

A general object of the invention is to provide a novel crushing unit which incorporates rolls made of yieldable material pressed together in deforming contact with each other in order to provide an extensive crushing and grasping area.

A further object of the invention is to provide a novel crushing unit wherein the crushing rolls are made up of a plurality of rubber or elastomer impregnated fiber disks of tire carcass material which includes fiber or cord interspersed in rubber-like material wherein the material provides numerous tentacles for grasping hay and the like, and pulling it through the rolls.

A still further object of the invention is to provide a pair of crushing rolls wherein the rolls are made up of a series of individual side-by-side disks clamped together so that the rolls are thus segmented to obtain regional flexing and thus accommodate the even mat of material passing between the rolls.

A still further object of the invention is to provide a novel release mechanism for the crushing rolls whereby if the rolls should become choked a simple and effective mechanism is provided for separating the rolls to pass the material therebetween and unplug the unit.

These and other objects of the invention will become more apparent from the specification and the drawings wherein:

Figure 1 is a plan view of a novel crusher incorporating the invention;

Figure 2 is a rear view of the crusher unit; and

Figure 3 is an enlarged sectional view taken substantially on the line 3—3 of Figure 2 with portions of the structure broken away in order to more clearly illustrate different aspects of the invention.

Describing the invention in detail the crusher generally designated 2 comprises a fore and aft extending framework 3 which includes a pair of forwardly converging beam members 4 and 5 joined into a hitch structure 6' by means of which the unit is adapted to be connected to an associated tractor.

The members 4 and 5 are connected intermediate their ends to a front beam 6 and at the rear ends to a transverse beam member 7, the ends of the beam member 7 being connected to fore and aft extending angle irons or side braces 8 and 9 which at their forward ends are connected through brackets 10 to the pipe or tube or rockshaft 6a.

The tube 6a is rotatable within the bracket 10 and at opposite ends mounts rearwardly extending arms 11 and 12 which at their rearward ends are provided with outwardly extending spindles 13 and 14 which mount the supporting wheels 15 and 16.

The wheels or ground traversing means 15 and 16 are disposed outwardly of the side panels 20 and 21 of the machine, said panels 20 and 21 being connected to the members 8 and 9 respectively and depending therefrom and receiving a pair of upper and lower rolls 22, 23 therebetween. It will be seen that the top roll 22 is substantially larger diametrically than the bottom roll 23.

Roller 22 is made up of a plurality of disks 24 which are made of tire carcass, that is, a rubber impregnated cord fabric integrated with rubber and these disks 24 form the body of the laminated roll and are each provided wtih a center opening 25 by which they sleeve onto a shaft 26 between the end caps 27 and 28 between which they are held under extremely high pressure, the cap 28 preferably being secured as by a pin 29 on the shaft 26 in order to make the assembly removable with respect to the shaft. Similarly the roll 23 is a laminated or segmental structure comprising a plurality of disks 30 which are of the character of tire carcass material, said disks each having a center opening 31 by which means the disks are sleeved on the shaft 32 and held in assembly between the end caps 33 and 34, cap 34 being releasably interlocked with the shaft 32 by a pin 35 extending through the shaft 32 outwardly of the cap 34, said caps 33 and 34 holding the said disks 30 at great pressure therebetween to provide a unitary structure.

It will be seen that both of the rolls 22 and 23 are crowned at their center portions 37 and 38 and that the disks at the center are of course the largest in diameter and are gradually reduced in diameter as they approach each end of the roll. The function of crowning these rolls is to account for the deflection of the long rolls and the shafts as the two rolls are pressed against each other as shown in Figure 2 in order to provide an extensive crushing and grasping area 40 therebetween. This feature solves the problem of insuring proper engagement between the rolls along their full extent. By segmenting the rolls and providing a series of individual disks, the rolls are afforded individually flexible segments to accommodate non-uniform bunching of the material along the length of the rolls. Furthermore, I have found through actual use of this equipment in the field that the imbedded fiber in the disks provides tenacles which serve to grasp the cut hay which is laying in a swathe on the field along which the machine is advanced with the bight 41 between the rolls facing forwardly into the direction of travel of the machine in order to draw the material through the rolls between which it is crushed. It will be understood that the expression rubber impregnated fiber disks is not intended to limit the structure to natural rubber but is used only as descriptive of an elastomer product having like characteristics.

The lower or driven roll is carried by its shaft 32 on bearings 44, 45 rigidly mounted on the side walls 20 and 21 of the unit transverse to the direction of travel of the machine and shaft 32 is provided with a sprocket 47 driven by chain 48 on the sprocket 49 which is mounted on the countershaft 50 which is carried by bearing 51 on the member 8, the shaft being connected through a gear box 52 to a forwardly extending transmission shaft 53 which is adapted for connection to the power take-off of the associated tractor as is well known to those skilled in the art.

The upper roll 22 is carried at each end on a bearing 55 which is mounted on an arm 56 intermediate the ends thereof. It will be seen that the shaft 56 projects through a vertically elongated slot 57 in each end wall 20 and 21 whereby the upper roll is movable vertically with respect to the lower roll. The forward end of the arm 56 is pivotally mounted as at 60 on the pipe 6a and the rear end of the arm 56 is provided with an upstanding ear 61 which at its upper end is pivotally connected as at 62 on an axis transverse to the plane of the arm 56 and generally parallel to the axis at 60 to a cross shaft or cross head 63.

It will be seen from Figure 2 that the cross member 63 extends across the width of the machine and that each arm 56 is pivoted similarly to the adjacent end of the member 63. Each end of the cross head member 63 is carried by a toggle linkage 65. Each of these linkages comprising top and bottom links 66 and 67, link 67 comprising a pair of straps 68 which at their lower ends receive the shaft 63, the straps 68 being pivoted on a generally horizontal axis to shaft 63 as by pin 69 at their lower ends, the axis of pin 69 extending diametrically with respect to the shaft 63. Each link 66 is pivotally connected at its upper end by a crank structure 70 to an upstanding bracket 71' and the links 66, 67 are interconnected at their adjacent ends by a common transverse pin 71 to the adjacent end of a push rod 72 which is urged in the direction of the toggle by the compression spring 73 which extends generally parallel to the member 63, spring 73 being under compression between the abutments 74 on the adjacent ends of the rods 72. Thus it will be seen that the upper roll is continuously biased downwardly against the driving roll.

In order to release the rolls when the amount of material intended to pass through should become too large there is provided a release mechanism comprising a hydraulic ram which comprises a cylinder 75 pivoted at one end as at 76 by a bracket 77 to the frame structure 3, namely, the frame member 4, the cylinder 75 carrying the piston and stem assembly 78 therein, the stem being pivoted as at 79 to the upper end of an arm 80 which is integrally connected with the pipe 6a whereby extension of the ram rotates the pipe in the direction raising the unit by rotating the arms 11 and 12 of the wheel in axial assembly downwardly. The tube 6a is provided with an integral depending arm 81 which at its lower end is pivotally connected as at 82 to the forward end of a cam member 83, said cam member comprising a fore and aft extending strap portion 84 which has generally horizontal flat upper edge 85 ending beneath the bearing 55 and extending rearwardly therefrom. The upper edge 85 merges into an upwardly and rearwardly projecting diagonal cam profile or edge 86 on the wide rear portion 87 of the cam member, the edge 86 adapted to engage with the periphery 88 of the bearing 55 which carries the roller 22 as the cam member is pulled forwardly due to counterclockwise rotation of the tube 6a. There is also provided on the portion 84 a flat generally horizontal bottom edge surface 90 which travels on a roller 91 which is spindled on a shaft 92 which is mounted on the adjacent side walls 20 and 21. The roller 91 is adapted to engage with a downwardly and rearwardly extending cam edge or profile 93 at the moment the edge 86 engages the bearing 55 whereby after a predetermined amount of rise in the machine attendant to rotation of the tube 6, the shaft 26 with the roller 22 is cammed upwardly between the roller 91 and the cam member 83 whereby the arm 56 is swung upwardly about its forward pivot 60 with attendant compression of the spring 73 through jackknifing of the linkages 66, 67.

In order to reengage the rolls, the ram unit is retracted and the motion thus is reversed, the unit moving downwardly into operating position with the cam disengaged and assuming the position shown in Figure 3 whereupon the upper roll is brought into engagement with the lower roll and the unit is thus ready for operation.

What is claimed is:

1. In a crop crushing machine, a frame, a pair of superposed crushing rolls rotatably mounted on the frame and movable toward and away from each other, means operatively associated with the rolls and yieldably biasing them toward each other, means for separating the rolls against the resistance of said means comprising camming means on the frame, a cam member movably mounted on the camming means for movement transversely of said rolls and having a first cam surface engageable with said camming means and a second camming surface engageable with one of the rolls substantially coincidental to said first surface engaging said camming means for moving the one roll away from the other, said member having an uncammed and a cammed position, operating means operably associated with said member for moving the same from one position to the other, ground traversing means supporting the frame from the ground and positionable to support the rolls in elevated position above the ground and lowered position adjacent to the ground, and linkage operatively connected to said operating means for positioning said supporting means in said position thereof consequent to positioning of the said member in cammed and uncammed positions thereof.

2. A crop gathering and crushing device comprising a frame, a rockshaft mounted on the frame for swinging movement on a generally horizontal axis, arms connected to the rockshaft, wheels spindled on the arms for supporting the frame from the ground, a pair of crushing rolls rotatably supported from the frame, one of said rolls being movable radially relative to the other, means including spring means biasing said rolls into engagement, a cam roller carried by the frame alongside each end of the movable roller, said cam roller rotatable on an axis generally parallel to said rolls, a cam interposed between the roller and respective end of the movable roll and shiftable from a neutral position to a position lifting said movable roll to separate it from the other roll, and linkage interconnecting said cam with said rockshaft for shifting the cam into lifting position attendant to lifting the frame to transport position, and a power device connected to said rockshaft for operating the same.

3. A crop gathering and crushing device comprising a frame, a rockshaft mounted on the frame for swinging movement on a generally horizontal axis, arms connected to the rockshaft, wheels spindled on the arms for supporting the frame from the ground, a pair of crushing rolls rotatably supported from the frame, one of said rolls being movable radially relative to the other, means including spring means biasing said rolls into engagement, a cam roller carried by the frame alongside each end of the movable roller, a cam interposed between the roller and respective end of the movable roll and shiftable from a neutral position to a position lifting said movable roll to separate it from the other roll, and linkage interconnecting said cam with said rockshaft for shifting the cam into lifting position attendant to lifting the frame to transport position, and a power device connected to said rockshaft for operating the same, said means including a toggle linkage mounted at each end of the frame, an equalizer bar interconnecting said toggle linkage, and load transmitting arms movably carried by the frame and operatively associated with said movable rolls and connected to said equalizer bar.

4. A crop gathering and crushing device comprising a frame, a rockshaft mounted on the frame for swinging movement on a generally horizontal axis, arms connected to the rockshaft, wheels spindled on the arms for supporting the frame from the ground, a pair of crushing rolls rotatably supported from the frame, one of said rolls being movably radially relative to the other, means including spring means biasing said rolls into engagement, a cam roller carried by the frame alongside each end of the movable roller, a cam interposed between the roller and respective end of the movable roll and shiftable from a neutral position to a position lifting said movable roll to separate it from the other roll, and linkage interconnecting said cam with said rockshaft for shifting the cam into lifting position attendant to lifting the frame to transport position, and a power device connected to said rockshaft for operating the same and said means including a toggle at each end of the frame and each comprising top and bottom links pivoted together at adjacent ends, said top links having upper ends pivoted to the frame, an equalizer extending between and pivoted to said bottom links, spring means reacting between said toggles at the pivot of the top and bottom links, and arms pivoted on the rockshaft and mounting said movable roll and operatively connected to the equalizer.

5. In a crop pick-up and crushing device, a frame, a supporting wheel and axle assembly mounted on the frame and movable to elevate the frame to transport position and lower it to operating position, a pair of crushing rolls rotatably carried on the frame, one of said rolls being stationary and fixed with respect to the frame and the other movable toward and away with respect to the one roll, cam means interposed between the frame and said movable roll, means operatively associated with said movable roll for biasing the same under pressure against the stationary roll, and linkage interconnecting said wheel and axle assembly with said cam means for conjunctively lowering the assembly and releasing the cam means and raising the assembly while camming said cam means.

6. In a device of the class described, a frame having an elongated structure with depending end portions and front and rear sides, an upper and a lower roll disposed in superposed relation between said end portions and each having a shaft extending through apertures in said portions, bearing means fixedly mounting the shaft of the lower roll on said portions, said apertures through which the shaft of the upper roll extends being vertically elongated whereby said upper roll is movable upwardly and downwardly with reference to said lower roll, brackets on said structure projecting forwardly therefrom, a rockshaft journalled on the brackets, a pair of rearwardly extending arms connected to said rockshaft, wheel means journalled on the rear ends of said arms, levers disposed outwardly of said end portions and having forward ends pivoted on the rockshaft and journalling intermediate their ends said shaft of the upper roll, means operatively associated with the rear ends of said levers for urging the same downwardly for engaging the upper roll with said lower roll, a cam member at each end of said structure outwardly of the end portions, cam means on each end portion underposed with respect to the adjacent cam member and in engagement therewith, and with a portion of the adjacent lever, depending lever arms on said rockshaft connected to respective cam members, and means for rocking said rock shaft to raise and lower the frame and to coincidentally move the cam to separate the upper roll from the lower and vice versa.

References Cited in the file of this patent

UNITED STATES PATENTS

| | | |
|---|---|---|
| 296,081 | Steel | Apr. 1, 1884 |
| 2,811,819 | Heth | Nov. 5, 1957 |
| 2,825,217 | Byrd | Mar. 4, 1958 |